United States Patent [19]
Coffman et al.

[11] Patent Number: 5,902,987
[45] Date of Patent: May 11, 1999

[54] APPARATUS AND METHOD OF RAPIDLY LOCATING EDGES OF MACHINE-READABLE SYMBOLS OR OTHER LINEAR IMAGES

[75] Inventors: Ken Coffman, Mount Vernon; Pavel A. Maltsev, Edmonds, both of Wash.

[73] Assignee: Intermec IP Corporation, Beverly Hills, Calif.

[21] Appl. No.: 08/803,366

[22] Filed: Feb. 20, 1997

[51] Int. Cl.⁶ .................................................. G06K 7/10
[52] U.S. Cl. .................... 235/462.12; 235/462.1; 235/462.25; 235/462.41; 382/296; 382/199
[58] Field of Search ............................... 235/462, 463, 235/494, 461.01, 462.07, 462.1, 462.11, 462.12, 462.16, 462.19, 462.25, 462.41, 470; 382/296, 199, 46, 44, 22, 21

[56] References Cited

U.S. PATENT DOCUMENTS

| | | | |
|---|---|---|---|
| 4,013,893 | 3/1977 | Hertig | 250/568 |
| 4,874,936 | 10/1989 | Chandler et al. | 235/494 |
| 4,896,029 | 1/1990 | Changler et al. | 235/494 |
| 4,916,298 | 4/1990 | Raphaël | 235/463 |
| 4,973,829 | 11/1990 | Ishida et al. | 235/462 |
| 4,998,010 | 3/1991 | Chandler et al. | 235/494 |
| 5,189,292 | 2/1993 | Batterman et al. | 235/494 |
| 5,241,166 | 8/1993 | Chandler | 235/494 |
| 5,276,315 | 1/1994 | Surka | 235/462 |
| 5,324,923 | 6/1994 | Cymbalski et al. | 235/454 |
| 5,373,147 | 12/1994 | Noda | 235/462 |
| 5,487,115 | 1/1996 | Surka | 235/462 X |

Primary Examiner—Michael G. Lee
Attorney, Agent, or Firm—Seed and Berry LLP

[57] ABSTRACT

A method and apparatus locates edges of patterns in a stored image, such as edges of bars or finder patterns of machine-readable symbols. The present invention first selects an edge point or pixel within a stored image. A dominant direction is determined therefrom by examining a region surrounding the selected point. A smaller window is then examined around the edge point to derive a hexadecimal code based on binary values of pixels which surround the edge point. The hexadecimal code is compared to a table of codes, where each code maps to a similar window and identifies a next edge point. The process continues in the dominant direction until the entire edge is located. Circuitry for rapidly performing the its location of patterns in a stored image, such as ages of bars of finder patterns of machine-readable symbols.

32 Claims, 12 Drawing Sheets

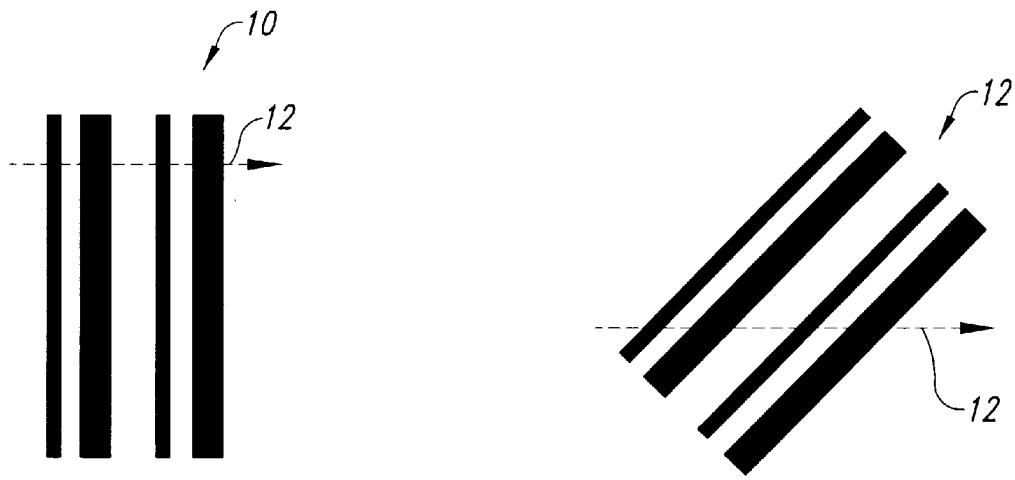
Fig. 1
*(Prior Art)*
Fig. 2
*(Prior Art)*
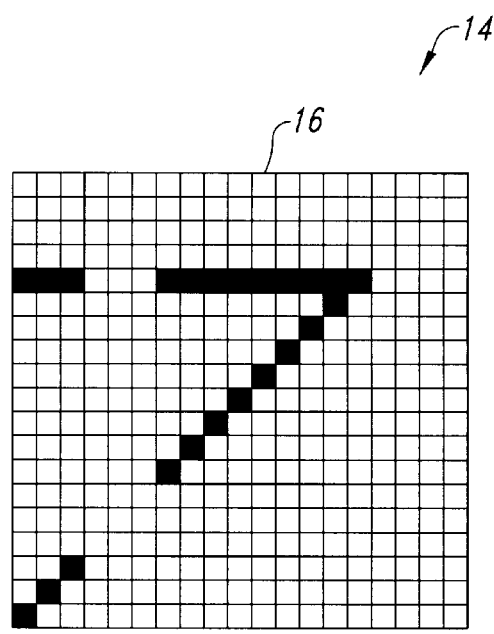
Fig. 3
*(Prior Art)*

50, E0, E1, E7, 20, 60, E3, EF.

F9, 18, 38, 78, F8, 8, FB.

4, C, 3C, FC, 7C, 1C, FD.

5, E, 1E, 7E, 2, 6, 3E, FE.

F, 1F, 3F, 1, 3, 7, 7F.

9F, 81, 83, 17, 8F, 87, 80, BF.

F0, F1, F3, 10, 30, 70, F7.

APPARATUS AND METHOD OF RAPIDLY LOCATING EDGES OF MACHINE-READABLE SYMBOLS OR OTHER LINEAR IMAGES

TECHNICAL FIELD

This invention relates to optical reading systems for machine-readable symbols and, more particularly, to locating portions of bar code symbols or images within a stored two-dimensional image.

BACKGROUND OF THE INVENTION

Systems for optically scanning patterns and then analyzing the data to "recognize" the patterns are common. A typical form of optical pattern recognition is depicted in FIGS. 1 and 2 as a simplified version of the common linear or one-dimensional bar code 10. As depicted in FIGS. 1 and 2, a scanning beam 12 is scanned across the bar code 10 by a scanning device. A string of reflectance values are thereby produced which represent the transitions from bars to spaces along the scanning beam 12. Alternatively, an entire image or "snapshot" of the symbol 10 is taken by the reader. The data as reflected from the bar code 10 is then placed into a computer memory 14 on a pixel-by-pixel basis as pixel data 16, as depicted in FIG. 3, where each square in FIG. 3 represents a unique memory location. Since the data in the bar code 10 is arranged along one dimension, it does not matter whether the scanning takes place perpendicular to the bar code 10 as depicted in FIG. 1 or at an angle as depicted in FIG. 2. Similarly, it does not matter whether the pixel data 16 are located one-dimensionally or two-dimensionally within the computer memory 14 since the reader can readily analyze the data to determine the contents thereof. However, if the memory is large, includes multiple bar code images or images with significant background noise, the reader requires time consuming methods to locate and decode the bar code.

Optical Character Recognition (OCR) as it relates to the ability to "read" alphanumeric characters is another matter since the data is now related to a two-dimensional character. Thus, the problem is different if a character 18 being "scanned" is oriented in a known perpendicular direction as in FIG. 4 or skewed as in FIG. 5. While the character 18 can be scanned on a line-by-line basis by a raster scanning technique, it is easier and most common to simply view the character 18 two-dimensionally with, for example, a charge coupled device (CCD) camera which provides pixel data 16' within a computer memory 14 in the manner depicted in FIG. 6.

The contents of the computer memory 14 must then be analyzed on a correlated line-by-line basis as depicted in FIG. 7. The prior art techniques for analyzing the data from each line 20 of the memory 14 are complex and time-consuming, particularly if multiple fonts are to be "recognized" and orientations other than perpendicular are to be included. As can be appreciated, the prior art methodology of character recognition from the data 16' on a horizontal and vertical basis (i.e., line-by-line forward and backward and across each line pixel position-by-pixel position) cannot be accomplished in real-time. That is, the data must be scanned and then analyzed in a process that can literally take minutes for a standard page of characters.

While suffering from some of the processing intensive limitations of OCR, two-dimensional symbols or bar codes as depicted in FIG. 8 allow much more data to be represented in a much smaller space. FIG. 8 shows a so-called "Code-One" type of bar code 22. Code-One bar codes are of various types; but, each contains two components—an orientation pattern 24 and attached 2D data 26. A portion of the orientation pattern 24 from the bar code 22 of FIG. 8 is shown in FIG. 9. The orientation pattern 24 comprises a central portion 28 that defines the type of Code-One bar code present and is uniquely identifiable and locatable as to orientation; and, peripheral portions 30 that define the extents and sizing of the 2D data 26.

The central portion 28 has a plurality of "vertical" edges 32 and "horizontal" edges 34 when the bar code 22 is in its proper orientation, and the edges are in a fixed relationship to one another. Thus, regardless of the orientation, if the vertical and horizontal edges can be found, the type of bar code 22 can be determined, its orientation can be determined, and the 2D data 26 can be interpreted.

FIG. 10 shows another two-dimensional symbol, namely a PDF 417 symbol 40. The orientation pattern consists of start and stop patterns 42 and 44. The start and stop patterns include very large or wide bars relative to the rest of the symbol, 46 and 48, respectively. The bars 46 and 48 can be found within the stored image (e.g., by locating their elongated edges), and thus the position and type of the bar code 40 can be determined. Thereafter, three rows of bars and spaces 39 positioned between the start and stop patterns 42 and 44 can be decoded.

Prior art techniques for locating and decoding two-dimensional symbols still approach the problem in the same manner as with OCR or alphanumeric data. All the pixels of the scanned 2D image are stored in a computer memory and then the data is analyzed on a line-by-line basis. As compared with recognizing an "H" surrounded by white space, a reader has difficulty recognizing one of many orientation patterns 24 within the bar code 22 as in FIG. 8, or the start and stop patterns 42 and 44 within the bar code 40 as shown in FIG. 10, particularly if the patterns must be quickly located.

When scanning or imaging two-dimensional bar codes at a point of sale, work station, or the like, a recognition process can take minutes to accomplish. Readers may also have difficulty in quickly locating and decoding traditional bar codes. The finding and decoding of the data must take place in real-time or close to real-time. A typical consumer requirement is to have the data available in one second or less. Therefore, it is desirable to provide a method of analyzing optically stored data associated with machine-readable symbols or characters which can find and decode the data in real-time or close to real-time.

Most two-dimensional imagers or readers first store an image or "snapshot" of the machine-readable symbol. Thereafter, the reader attempts to locate the image of the symbol within the stored image. One method of locating a symbol image within the stored image attempts to locate an edge of a bar of the symbol, which is described in detail in U.S. patent application Ser. No. 08/607,100, entitled "Method and Apparatus for Accurately Locating Data Regions in Stored Images of Symbols," filed Feb. 26, 1996, and assigned to the assignee of the present invention. Other robust methods of locating symbol images within stored images are described in detail in U.S. patent application Ser. No. 08/687,659, entitled "Time-Efficient Method of Analyzing Imaged Input Data to Locate Two-Dimensional Machine-Readable Symbols or Other Linear Images Therein," filed Jul. 26, 1996, U.S. patent application Ser. No. 08/602,624, entitled "Method and Apparatus for Locating and Decoding Machine-Readable Symbols," filed Feb. 16, 1996, and U.S. patent application Ser. No. 08/654,925, entitled "Method and Apparatus for Locating an Decoding Machine-Readable Symbols, Including Data Matrix Symbols," filed May 29, 1996, all of which are assigned to the assignee of the present invention. These methods, however, often require significant processing time. As a result, many of these methods require high-speed, and costly, processors, or undesirable delays with slower processors.

SUMMARY OF THE INVENTION

In general, edge detection is important in most methods of locating and decoding machine-readable symbols. In a digitized and stored image of a symbol, edges represent pixel areas where the brightness value changes abruptly due to changes in the reflectance properties of the scanning surface (i.e., symbol). To speed the edge detection process, embodiments of the present invention employ a lookup table that is constructed based on the geometrical properties of edge lines in most digital images. As a result, the present invention solves problems of the prior art and provides additional benefits by locating edges of patterns in stored images of symbols or linear visual elements by essentially performing the following steps:

(1) locating a pixel transition for a potential edge of the stored image of a symbol;

(2) determining a dominant orientation of the potential edge;

(3) identifying a next edge pixel based on a table of coded 3 pixel×3 pixel possible templates or windows; and (4) repeating steps (2) and (3) until an edge has been detected and identified.

After the edge has been identified, the symbol is thereby located within the stored image. Once located, the symbol can be readily decoded using known techniques.

In a broad sense, the present invention preferably embodies several methods and apparatus of analyzing a stored image. Under an embodiment of the present invention, an edge detecting apparatus detects an edge of an elongated shape in a stored image. The stored image is comprised of a plurality of pixels. The apparatus includes an edge pixel detector, a memory and a pixel analyzer. The edge pixel detector detects an edge pixel of the elongated shape in the stored image. The memory has sets of codes stored therein. Each code in the set indicates a next pixel depending upon a selected arrangement of pixels in a predetermined area of pixels. The pixel analyzer is coupled to the memory and sequentially analyzes a current arrangement of pixels in the predetermined area about the edge pixel. The pixel analyzer compares the analyzed area to a corresponding code in the set of codes and locates a next edge pixel based on the corresponding code in the set, until at least a portion of the edge of the elongated shape is located in the stored image.

Under another embodiment of the present invention, a method locates an edge of an elongated shape in a stored image, where the image is comprised of a plurality of pixels. The method includes the steps of: (a) selecting a starting edge pixel in the stored image of an edge of the elongated shape; (b) analyzing an arrangement of pixels in an area about the edge pixel; (c) comparing the analyzed area to a corresponding code in a set of codes, each code in the set indicating a next pixel depending upon predetermined arrangements of pixels in the area; (d) locating a next edge pixel based on the corresponding code in the set; and (e) repeating the steps of analyzing, comparing and locating until at least a portion of the edge is located.

BRIEF DESCRIPTION OF THE DRAWINGS

FIG. 1 is a simplified drawing showing a scanning beam scanning across a one-dimensional bar code perpendicular to the bar code.

FIG. 2 is a simplified drawing showing a scanning beam scanning across a one-dimensional bar code at an angle to the bar code.

FIG. 3 is a simplified drawing depicting the pixel data created in a computer memory by the scannings of FIGS. 1 and 2.

DETAILED DESCRIPTION OF THE INVENTION

A machine vision system, and in particular, an apparatus and method for locating edges of data collection symbols or other machine-readable images, is described in detail herein. In the following description, numerous specific details are set forth such as specific coding designations, specific arrangements of pixels in certain sized windows, order and execution of steps, etc., in order to provide a thorough understanding of the present invention. One skilled in the relevant art, however, will readily recognize that the present can be practiced without those specific details or with other symbols, methods, elements, etc. In other instances, well-known structures or operations are not shown or described in detail in order to avoid obscuring the present invention.

Figure 4:
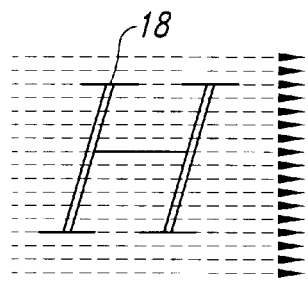
FIG. 4 is a simplified drawing depicting optically scanning across or imaging a two-dimensional alphanumeric character perpendicular to the character.
Figure 5:
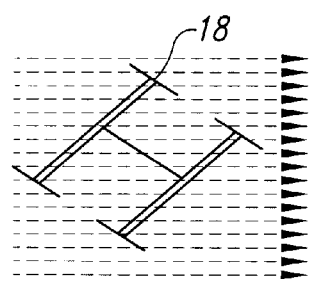
FIG. 5 is a simplified drawing depicting optically scanning across a two-dimensional alphanumeric character at an angle to the character.
Figure 6:
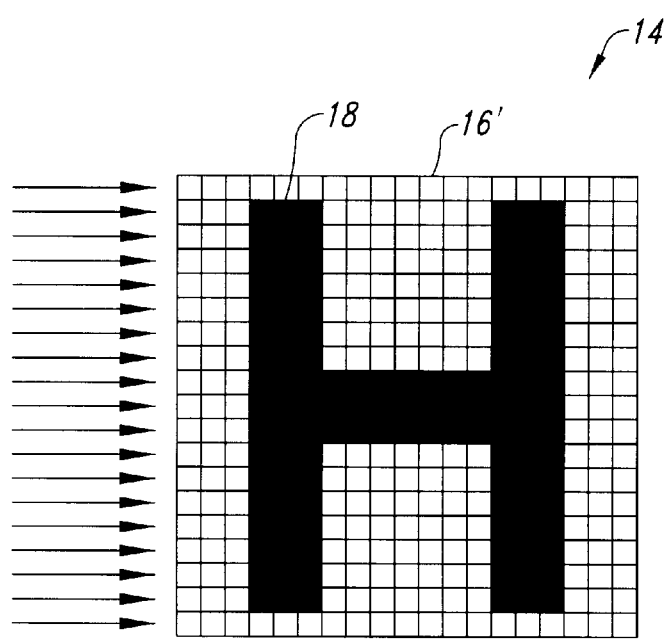
FIG. 6 is a simplified drawing depicting the pixel data created in a computer memory by the scannings or imaging of FIG. 4.
Figure 7:
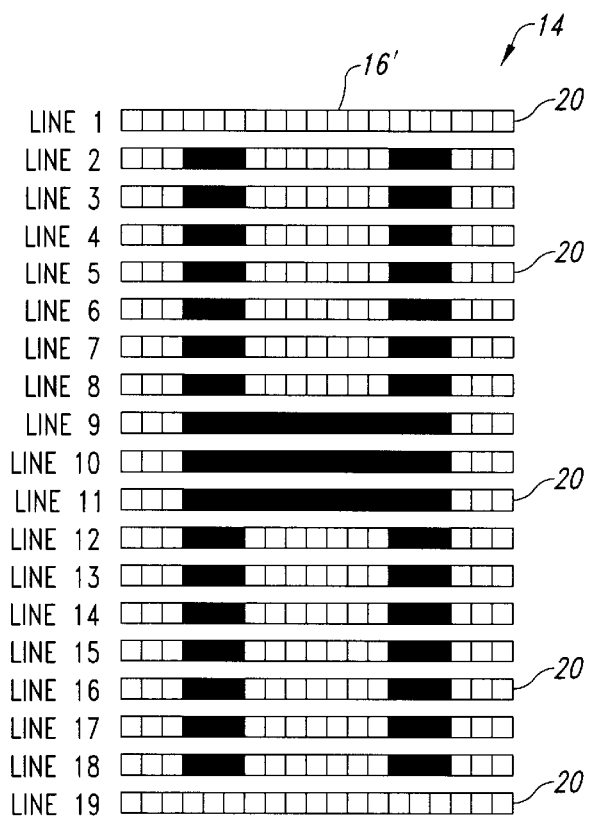
FIG. 7 depicts the individual lines of pixel data in the computer memory which must be analyzed to optically "recognize" the character when doing so according to prior art techniques.
Figure 8:
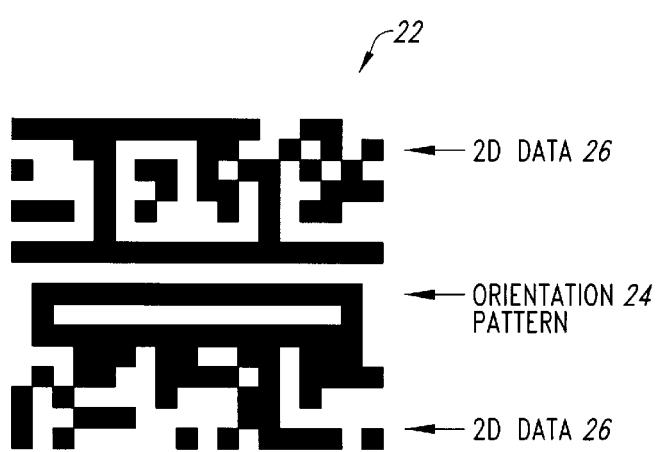
FIG. 8 is a drawing of a Code-One two-dimensional bar code symbol.
Figure 9:
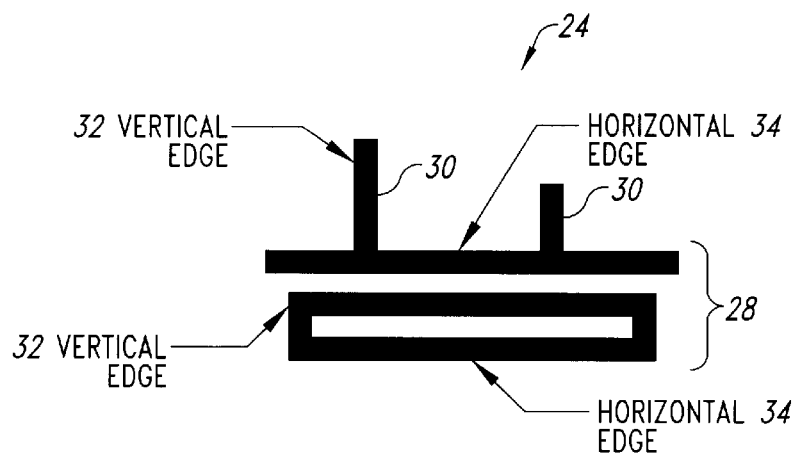
FIG. 9 is a drawing of a portion of the orientation pattern of the symbol of FIG. 8.
Figure 10:
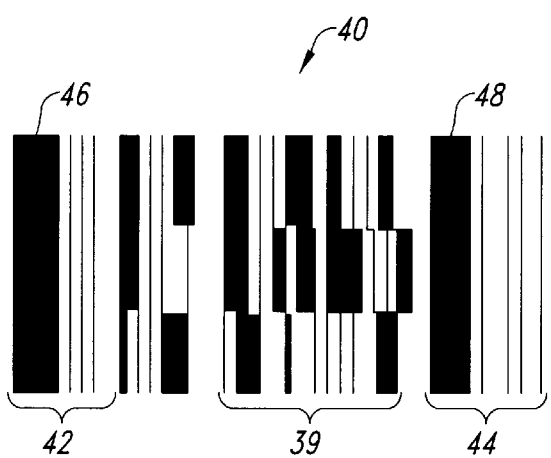
FIG. 10 is a drawing of an exemplary PDF 417 two-dimensional bar code symbol.
Figure 11:
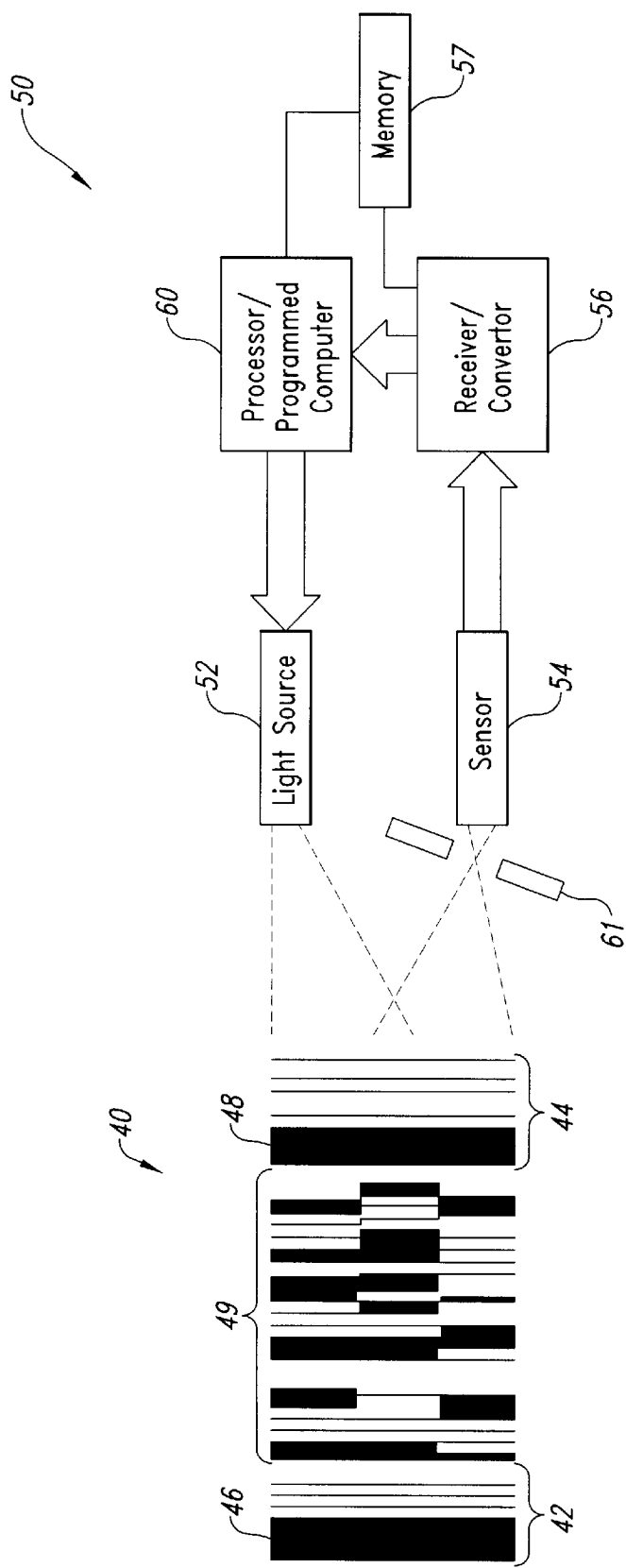
FIG. 11 is a block diagram of an exemplary implementation of the present invention for reading machine-readable symbols or other images.

As shown in FIG. 11, a first embodiment of a data collection symbology reader of the present invention, shown as reader 50, includes a light source 52 that illuminates a data collection or other symbol, such as the PDF 417 symbol 40. As used herein, a "data collection symbol" refers to a symbol from any linear, stacked, area or other machine-readable symbology. A sensor 54 having an optical aperture 61, receives light reflected from the symbol 40 and converts the received light into an electrical signal or profile. For example, the light source 52 can be an LED, flashbulb, infrared light source, rasterizing laser, or other light-emitting element, while the sensor 54 can be a one- or two-dimensional CCD, semiconductor array, photodetector, vidicon, or other area imager capable of converting received light into electrical signals. Additionally, the present invention can omit the light source 52, and rely on ambient light.

A receiver or converter 56 receives the electrical signal from the sensor 54 and converts into a signal to be processed by a programmed computer or processor 60. Typically, the sensor 54 produces an analog profile signal that represents the modulated light reflected from the elements in the symbol 40. Importantly, if the processor 60 is a digital computer, then the converter 56 converts each pixel in the image of the symbol 40 from an analog signal produced by the sensor 54 to a multi-level digital signal that numerically represents the various amplitudes of the analog signal. The converter 56 and/or processor 60 are coupled to memory 57 for storing the profile in digital form. The converter 56, memory 57 and processor 60 can be monolithically integrated.

The sensor 54 can be a charge-coupled device ("CCD") or similar area imager having a active surface such as a rectangular surface of M by N pixel elements, e.g., 582 by 752 pixel elements. As is known, each pixel element in the CCD array of the sensor typically outputs a gray level signal, i.e., an analog signal that determines the amount or intensity of light impinging upon the particular pixel element, similar to a video data signal. The converter 56 preferably converts the gray level signal into a digital signal having, for example, 16 levels of gray for use by the processor 60. The memory 57 stores the digital signals, and preferably includes both volatile and non-volatile memory (e.g., random access and electrically, erasable read-only memory). As a result the reader 50 allows an object or image within the field of view of the sensor 54 to be converted into electrical signals that are digitized and stored as a stored image in the random access portion memory 57 to be retrieved and processed by the processor 60 under a routine 100 stored in the read-only memory (as described below). After processing the stored image, the processor 60 can output the results of such processing to a peripheral apparatus or a computer (not shown).

Figure 12:
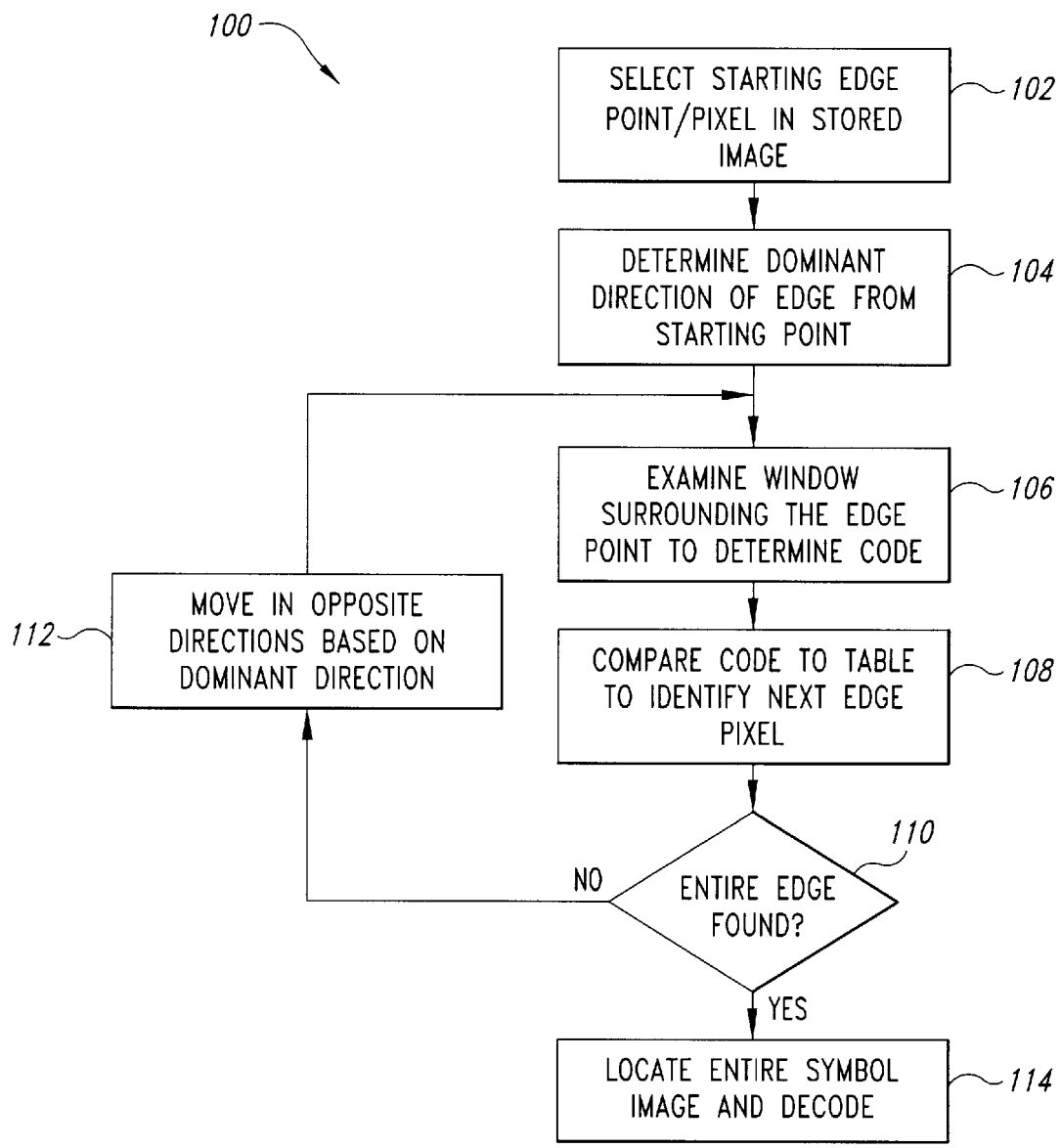
FIG. 12 is an exemplary flow diagram of a routine performed under the embodiment of the present invention to locate edges in stored images.

Referring to FIG. 12, an exemplary routine 100 performed by the reader 50 of the present invention locates an edge of the image of the symbol 40 within a stored image, and then employs the located edge for other functions, for example, ultimately decoding the symbol. As used herein, the term "stored image" generally refers to the overall image of the field of view stored in the memory 57 that has been produced by the sensor 54 and the processor 60, and which contains the symbol 40 or other symbols to be decoded. For processing efficiency, if the CCD in the sensor 54 has an array of 582 by 752 pixels, then the memory 57 includes a 582 by 752 array of memory locations addressed by the processor 60 that correspond to the array of pixels. The stored image in the memory 57 can be referenced by a Cartesian coordinate system so that the location of each pixel is represented by a pair of numbers indicating the horizontal and vertical position of the pixel in the stored image. For example, the first pixel in the top left corner of the stored image is assigned the Cartesian coordinates (0, 0), while the bottom right-most pixel is assigned the coordinates (751, 581). Therefore, objects within the stored image, i.e., groups of pixels, can be arithmetically located using geometric and trigonometric properties based on the coordinate system (e.g., equations of lines, circles, or other geometric or trigonometric equations used for representing planar objects, as described below). As used herein, the term "locates" generally refers to determining both the position and orientation of the image of an object within the stored image.

Before the routine 100 begins, the reader scans or stores an image of the symbol 40. For example, the reader 50 can be a hand-held product and include a trigger switch (not shown) coupled to the processor 60 that causes the light source 52 to illuminate the symbol 40, and allow the sensor 54, converter 56 and processor 60 to store an image of the symbol in the memory 57 upon actuation of the switch. The specific means and method for storing an image of a symbol by the reader 50 are conventional and will be understood by those skilled in the relevant art without need for further description herein.

In step 102 of the routine 100, the processor 60 begins to locate the symbol 40 within the stored image. The processor 60 identifies and selects one or more edge points or pixels in the stored image under conventional methods, such as by analyzing one or more sampling paths through the stored image. For example, the processor 60 analyzes a sampling path to locate a transition between two or more white pixels and two or more adjacent black pixels. Such a transition between white and black pixels can indicate the location of an edge or transition between a bar and space within the image of the symbol 40. A set of possible edge points are stored in the memory 57.

To determine whether a given pixel is white or black, the processor 60 preferably calculates a local threshold value for an intensity or brightness based on a square K×K area of pixels about a center point. The value of K, and thus the area of the square area surrounding the center point, depends on the size and resolution of the stored image. The processor 60 then uses the local intensity threshold to determine a threshold intensity value that defines or separates black pixels from white pixels.

In step 104, the processor 60 begins to determine if the selected edge point in the set of edge points is indeed a point of an edge (rather than simply noise, a printing defect, etc.), by first evaluating a "dominant direction" of the edge point. The processor 60 in step 104 calculates top-down and left-right density differences of the edge to approximately characterize the spatial orientation of the edge (i.e., whether it is oriented horizontally or vertically) so that an appropriate searching direction can be applied to an area adjacent to each edge point to determine position coordinates for a possible edge. While the first embodiment described below employs the processor 60 to evaluate the dominant direction, an alternative embodiment described thereafter employs simply hardware which can more quickly determine the dominant direction without computation, as described in detail below.

Figure 13:
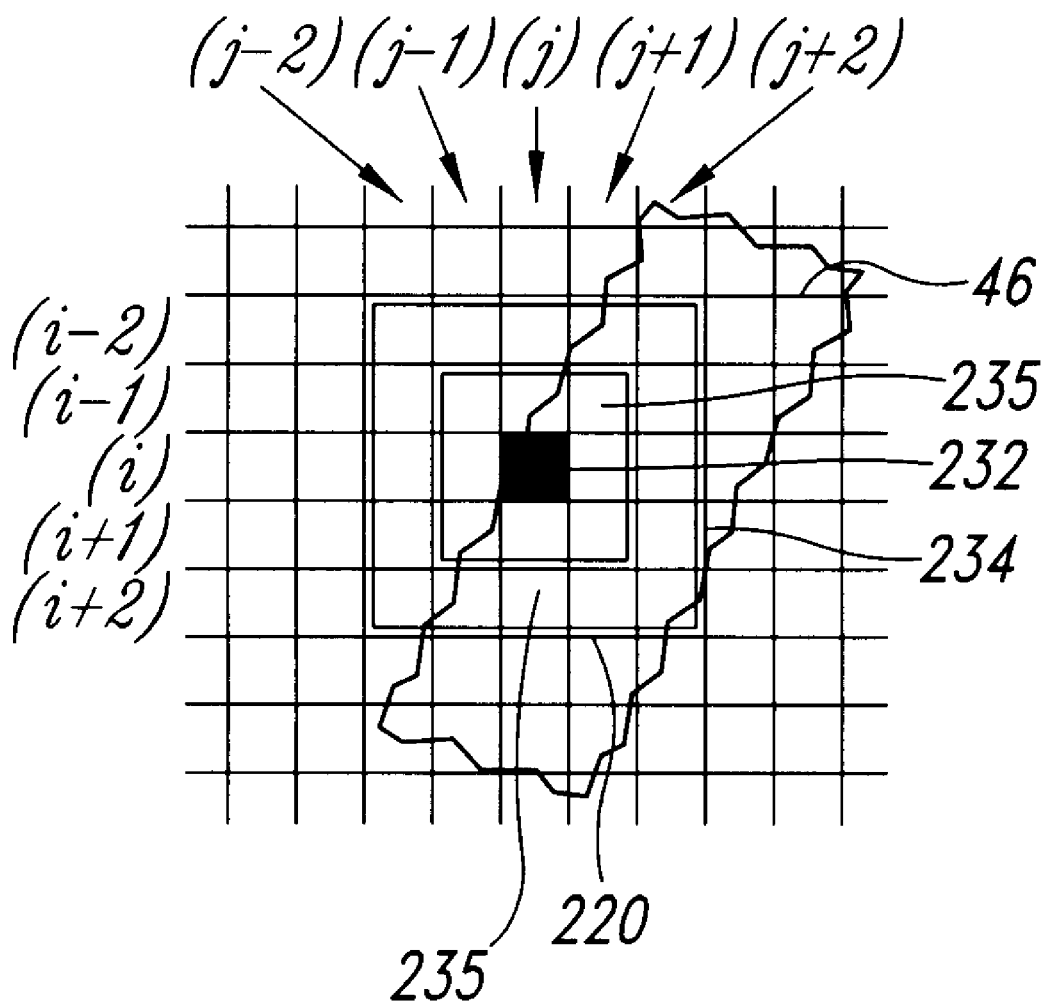
FIG. 13 is an enlarged portion of a wide bar having an exemplary grid of image elements or pixels overlaid thereon.

Referring to FIG. 13, the processor 60 in step 104 analyzes neighboring pixels within an environmental area 234 that surrounds an edge point 232 previously selected in step 102. The edge point 232 is a point on one of the bars in the symbol 40, such as wide bars 46 or 48 (indicating a change in intensity from white to black). The edge point 232 has coordinates (i, j), whereas the environmental area 232 is a square area that spans coordinates (i–2, j–2) to (i+2, j+2), resulting in a 5×5 pixel area. Of course, larger or smaller environmental areas 234 could be used at the sake of processing speed versus accuracy. To determine a top-bottom density difference, the processor 60 calculates a number of pixels within the top two rows of pixels, and the bottom two rows of pixels, that have an intensity or brightness greater than the previously calculated local intensity threshold. The pixel coordinates for the top and bottom groups or portions of the area 234 of the edge point 232 are as follows:

$$\begin{aligned} \text{Top Portion} &= \{\{(i-2),(j-2)\},\{(i-2),(j-1)\},\\ &\quad \{(i-2),(j)\},\{(i-2),(j+1)\},\\ &\quad \{(i-2),(j+2)\},\{(i-1),(j-2)\},\\ &\quad \{(i-1),(j-1)\},\{(i-1),(j)\},\\ &\quad \{(i-1),(j+1)\},\{(i-1),(j+2)\}\},\\ \text{Bottom Portion} &= \{\{(i+2),(j-2)\},\{(i+2),(j-1)\},\\ &\quad \{(i+2),(j)\},\{(i+2),(j+1)\},\\ &\quad \{(i+2),(j+2)\},\{(i+1),(j-2)\},\\ &\quad \{(i+1),(j-1)\},\{(i+1),(j)\},\\ &\quad \{(i+1),(j+1)\},\{(i+1),(j+2)\}\} \end{aligned} \quad (1)$$

Likewise, left-to-right pixel density differences are calculated based on intensity values greater than the calculated threshold for the left two columns and right two columns in the area 234, as represented by the following equation:

$$\begin{aligned} \text{Left Portion} &= \{\{(i-2),(j-2)\},\{(i-1),(j-2)\},\\ &\quad \{(i),(j-2)\},\{(i+1),(j-2)\},\\ &\quad \{(i+2),(j-2)\},\{(i-2),(j-1)\},\\ &\quad \{(i-1),(j-1)\},\{(i),(j-1)\},\\ &\quad \{(i+1),(j-1)\},\{(i+2),(j-1)\}\},\\ \text{Right Portion} &= \{\{(i-2),(j+2)\},\{(i-1),(j+2)\},\\ &\quad \{(i),(j+2)\},\{(i+1),(j+2)\},\\ &\quad \{(i+2),(j+2)\},\{(i-2),(j+1)\},\\ &\quad \{(i-1),(j+1)\},\{(i),(j+1)\},\\ &\quad \{(i+1),(j+1)\},\{(i+2),(j+1)\}\} \end{aligned} \quad (2)$$

The Top, Bottom, Left and Right Portions each represent a sum of the number of pixels within each Portion that are greater than the local intensity threshold. If each white pixel is assigned a value of 1, while each black pixel is assigned a value of 0, then for the example of FIG. 13, the Top Portion would have a value of 6. The Bottom Portion would in this example have a value of approximately 3. The top-bottom density difference is equal to the absolute value of the top portion minus the bottom portion (i.e., 6–3=3). Likewise, the left-right density difference is equal to the absolute value of the left portion minus the right portion (approximately 9–0=9).

If the following inequality:

$$(abs(TopPortion-BottomPortion)) \geq abs(LeftPortion-RightPortion)) \quad (3)$$

is true, then the horizontal direction is dominant; otherwise, the vertical direction is dominant for the area 234. For the example shown in FIG. 13, since the top-bottom portions are less than the left-right portions, the vertical direction is dominant under equation (3) above. Based on the dominant direction, the processor 60 determines whether to begin searching for edge pixels in opposite vertical, or opposite horizontal, directions from the starting edge point 232.

If the processor 60 fails to determine a dominant direction in step 104, for example, where the left and right parts in the equation (3) equal to zero, the processor determines that the starting edge point selected in step 102 is not an edge point, but rather noise or some other non-edge point in the stored image. Therefore, the processor 60 selects another starting edge point from the set of points from which to determine a dominant direction.

Figure 14:
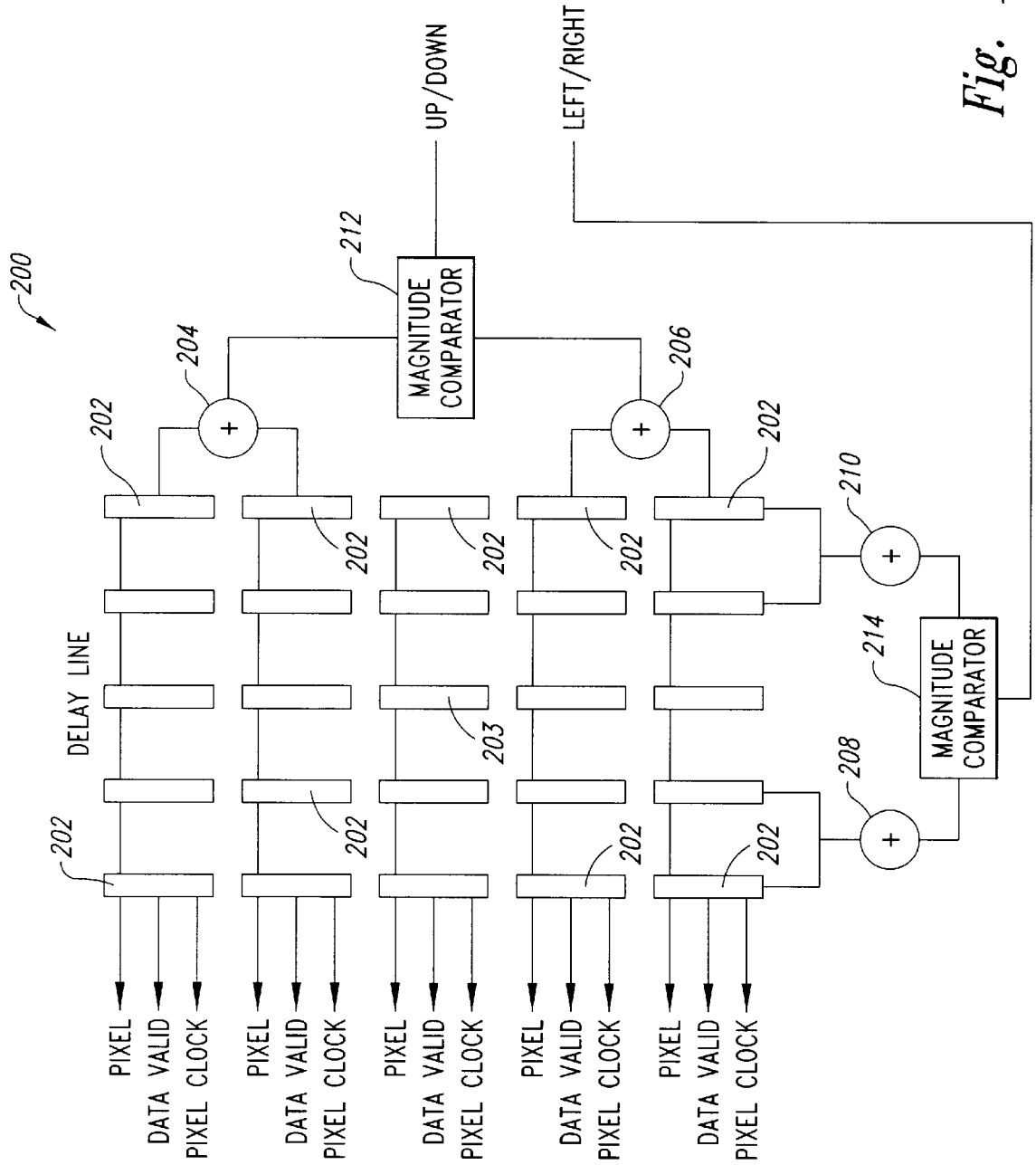
FIG. 14 is a block diagram of an alternative or additional embodiment of circuitry for determining top/down and left/right density.

Referring to FIG. 14, an alternative embodiment of a portion of the reader 50 is shown as an edge direction or orientation circuit 200. The edge orientation circuit 200 can form part of and be used with the reader 50. The circuit 200 includes five rows of delay lines, each having five delay elements 202, so as to form a 5×5 delay element array. Each delay element 202 stores a pixel value, such as the pixel values output by the sensor 54, or stored in the memory 57. Thus, the delay elements 202 can store either a binary value of the pixel elements (after an appropriate thresholding), or the analog or full 16 value digitized values of the pixels. A centrally located delay element 203 in the 5×5 element array stores the value of the edge pixel 232. The processor 60, or other conventional circuitry, provides a data valid and pixel clock signal to the delay elements 202 to appropriately clock or time in the pixel values so as to fill the 5×5 delay element array.

Four adder circuits 204 through 210 add the stored values of the pixels in the delay line elements 202. The adder 204 adds the pixel values stored in the two top rows of five delay elements 202, while the adder 206 adds the pixel values in the bottom two rows of delay elements 202. A magnitude comparator 212 then compares the added values from the adders 204 and 206 to determine whether the upper or lower rows of delay elements 202 (and thus pixels) are greater. Likewise, the adder 208 adds the left two columns of delay elements (each having five delay elements 202), while the adder 210 adds the pixel values stored in the right two columns of delay elements 202. A magnitude comparator 214 then compares the resulting added values from the adders 208 and 210 to determine whether the left or the right pixel values stored in the 5×5 array are greater. The resulting values output from the magnitude comparators 212 and 214 essentially determine a dominant direction of the 5×5 pixel area surrounding the center edge pixel 232, depending upon which output is greater. As a result, the edge orientation circuitry 200 performs in hardware the equation (3) above.

Referring back to FIG. 12, the processor 60 in step 106 begins to examine a window surrounding the edge point to determine an appropriate code. As described in an alternative embodiment below, pixel analysis circuitry operates to perform similar functions as the processor 60 to locate the edge extending from the starting edge pixel 232. In sum, the embodiment of the present invention grabs and stores the eight pixels that surround the edge pixel and compares the values of the pixels to a table of 56 windows or templates. The templates then identify a next edge pixel. The next edge pixel then becomes the center pixel and the eight surrounding pixels are subsequently grabbed and analyzed.

Figure 15:
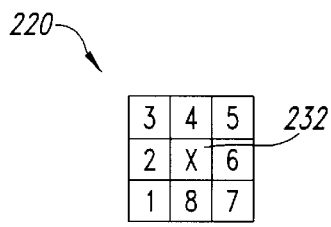
FIG. 15 is a schematic diagram of a 3 pixel×3 pixel window and ordering of pixels surrounding an identified center edge pixel.

Referring to FIG. 15, an exemplary analysis window 220 is shown as employed by an embodiment of the present invention. The analysis window is 3 pixels×3 pixels, and contains the starting (or subsequent) edge pixel 232 at its center. Surrounding the edge pixel 232 are eight pixels, which are sequentially numbered, such as is shown in FIG. 15 by starting in the lower left corner (pixel "1") and moving clockwise therefrom (pixels "2" through "8"). Each pixel in the window 220 is a binary value, where a white pixel corresponds to a binary value of 1, while a black pixel corresponds to a binary value of 0. As noted above, the binary values of each pixel in the window 220 can be simply determined by comparing the pixel value to a localized threshold value.

Figure 16:
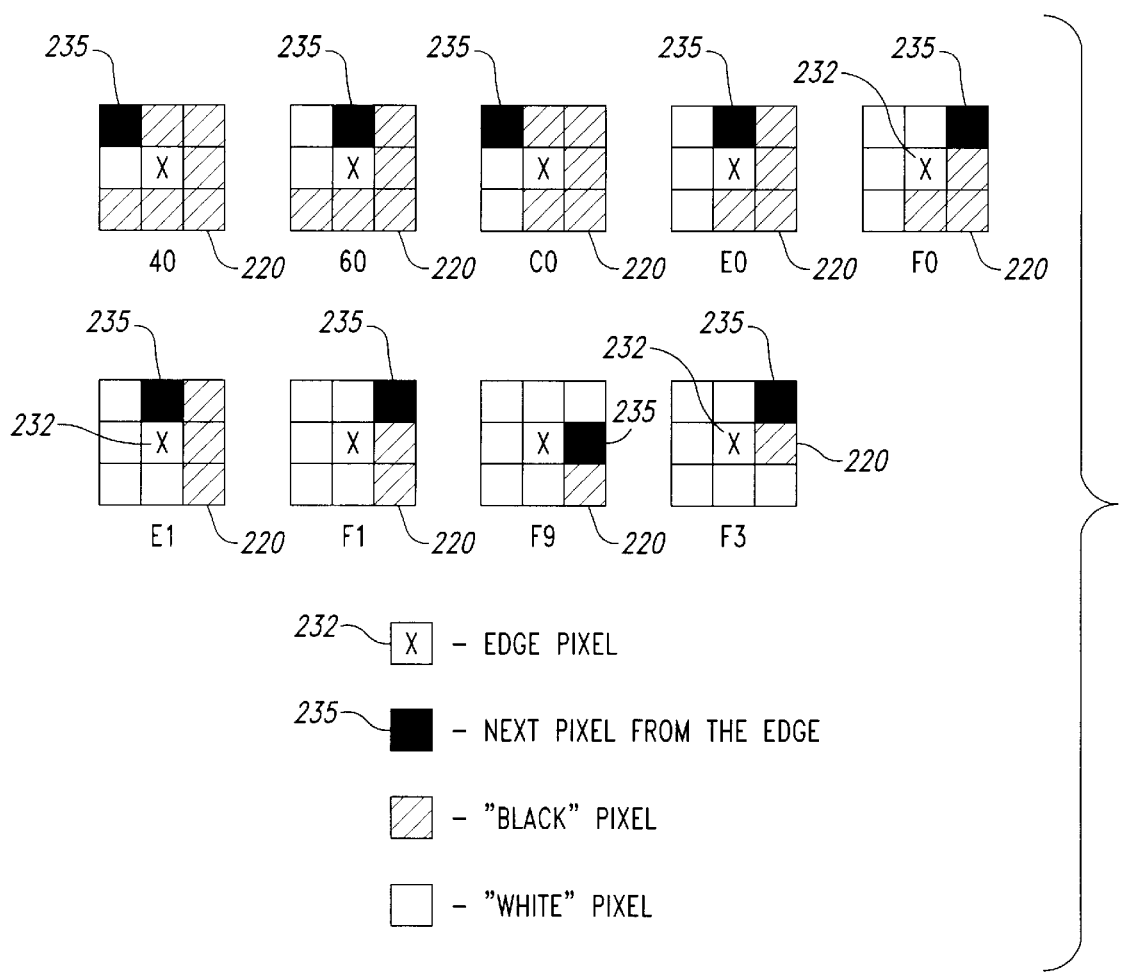
FIG. 16 is a schematic diagram of several representative pixel configurations and corresponding hexadecimal codes for the window of FIG. 15.

In the window 220, each surrounding eight pixels form an 8-bit binary value, or hexadecimal number, with the lower left pixel (pixel "1") representing the most significant bit, while the lower middle pixel (pixel "8") corresponds to the least significant bit. Assuming all pixels in the window 220 are black, except pixel "2," then the number 01000000 results, whose hexadecimal equivalent is 40. FIG. 16 shows such an arrangement of black pixels in the window 220. FIG. 16 also shows several additional exemplary pixel arrangements in the window 220 for corresponding hexadecimal codes 60, C0, E0, F0, E1, F1, F9, and F3. Each of the predetermined arrangements of pixels in the windows 220, and the their corresponding code, include a next pixel 235 from the central edge pixel 232.

Figure 17A:
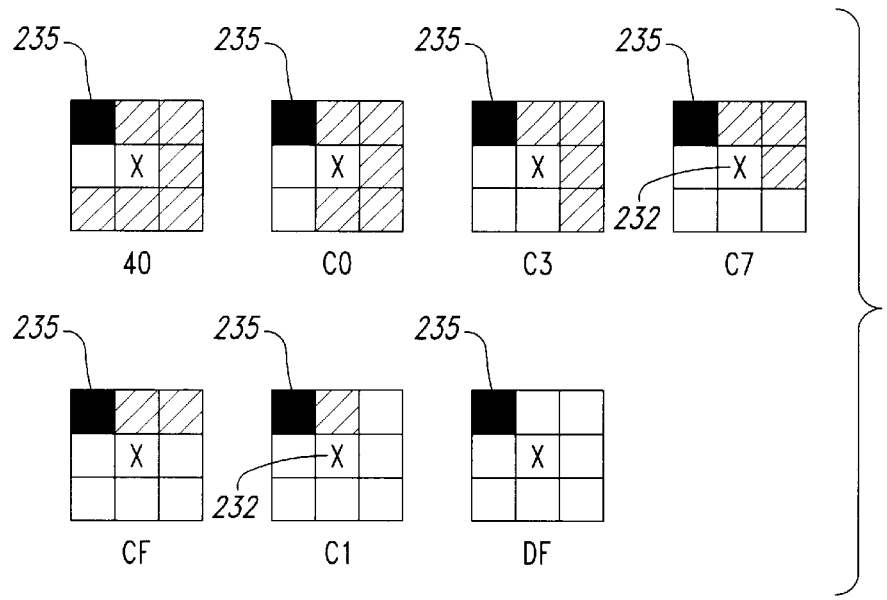
FIG. 17A is a schematic diagram of the 7-pixel configurations and corresponding hexadecimal codes for the window of FIG. 15, where the next pixel is in the top-left corner.
Figure 17B:
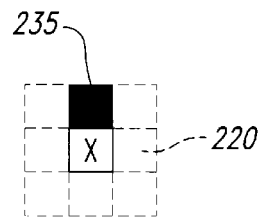
FIGS. 17B through 17H are schematic diagrams of the center and next pixel locations for the window of FIG. 15, and corresponding hexadecimal codes therefor.
Figure 17C:
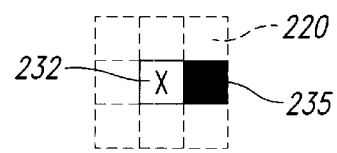
Figure 17D:
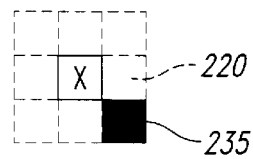
Figure 17E:
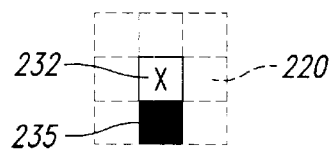
Figure 17F:
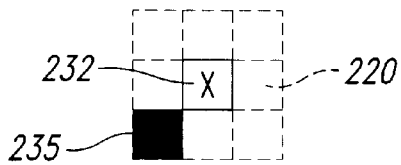
Figure 17G:
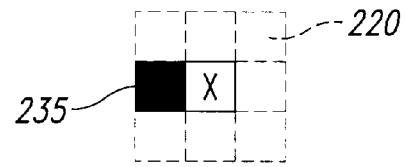
Figure 17H:
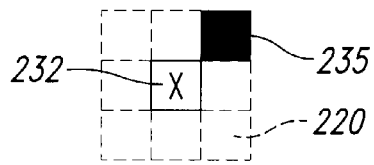

FIG. 17A shows the set of possible combinations of surrounding pixels and corresponding hexadecimal codes for the next edge pixel 235 located at the top left corner of the window 220 (pixel "3" location). As shown in FIG. 17A, the corresponding hexadecimal codes are 40, C0, C3, C7, CF, C1, and DF. FIG. 17B shows a schematic diagram of the window 220 with the next edge pixel 235 located at the top middle position of the window 220 (pixel "4" location), and the corresponding hexadecimal codes 50, E0, E1, E7, 20, 60, E3, and EF. FIG. 17C shows the next edge pixel 235 located at the right middle position of the window 220 (pixel "6" location), and the corresponding hexadecimal codes F9, 18, 38, 78, F8, 8, and FB. FIG. 17D shows the next edge pixel 235 located in the lower right corner of the window 220 (pixel "7" location), and the corresponding hexadecimal codes 4, C, 3C, FC, 7C, 1C, and FD. FIG. 17E shows the next edge pixel located in the lower middle of the window 220 (pixel "8" location), and the corresponding hexadecimal codes 5, E, 1E, 7E, 2, 6, 3E and FE. FIG. 17F shows the next edge pixel 235 located in the lower left corner of the window 220 (pixel "1" location), and the corresponding hexadecimal codes F, 1F, 3F, 1, 3, 7 and 7F. FIG. 17G shows the next edge pixel 235 located in the middle left of the window 220 (pixel "2" location) and the corresponding hexadecimal codes 9F, 81, 83, 17, 8F, 87, 80 and BF. FIG. 17H shows the next edge pixel 235 located in the top right corner of the window 220 (pixel "5" location), and the corresponding hexadecimal codes F0, F1, F3, 10, 30, 70 and F7.

Referring back to FIG. 12, the processor 60 in step 108 compares the code determined for the pixel arrangement examined in step 106 with a lookup table of all of the hexadecimal codes, which are shown in FIGS. 17A through 17H. Based on the corresponding hexadecimal code, the processor 60 determines the next pixel in the edge. By employing such hexadecimal codes, the processor 60 can look up the codes and determine the next edge pixel more rapidly than in prior art edge detecting routines.

For the example of FIG. 13, the processor 60 determines that pixels "5" through "8" in the window 220 have a zero value, while the pixels "1" through "4" have a one value. Based on this arrangement of pixels in the window 220, the processor 60 determines that the binary value for the window is 11110000, whose corresponding hexadecimal code is F0 (shown in FIG. 16). The processor 60 previously determined that the dominant direction for the edge of the bar 46 is vertical. As a result, the processor determines that the next edge pixel is in the upper right corner of the window 220, next edge pixel 235. Since the processor 60 preferably moves in opposite directions from the first determined edge point 232, the processor similarly determines that the next edge pixel in the opposite direction (downward) is a next edge pixel 235' shown in FIG. 13. By moving in opposite directions, the processor 60 can more rapidly locate a detected edge. The processor 60 employs a "mirror image" of the templates of FIGS. 17A through 17H to determine the next edge pixel in the opposite direction.

As can be seen from FIGS. 17A through 17H, 56 possible pixel arrangements or templates, and corresponding hexadecimal codes, are possible with a 3 pixel×3 pixel window 220. While a 3 pixel×3 pixel window is preferred for processing efficiency, a larger window, such as 5 pixel×5 pixel, can be employed under the present invention. Such a larger window can be more reliable but slower. Additionally, such a larger window could be inappropriate where bars of a given symbol are less than 5 pixels in width. Also, a considerably larger lookup table is required with a larger window.

In step 110, the processor 60 determines if the entire edge for the bar 46 has been found. If not, then in step 112, the processor 60 moves in opposite directions from the dominant direction determined in step 104 from the new edge pixel determined in step 108. The new edge pixel now becomes the center pixel 232 in the window 223. After once determining an edge point, such as the edge pixel 232, the processor 60 moves in opposite directions therefrom in the dominant direction, as noted above, as the processor loops through steps 106, 108, 110, and 112. With the exemplary bar 46 of FIG. 13, the processor 60 moves both upward and downward from the initial edge pixel 232.

The processor 60 determines in step 110 that the entire edge has been located if, for example, no hexadecimal code matches the current arrangement of pixels in the window 220, the detected edge begins to deviate from the dominant direction, or other predetermined indication that an edge has been obtained. The locations of all identified edge pixels are stored in the memory 57. Therefrom, the processor 60 can identify the location, and orientation, of the edge of the bar 46 in the stored image. Thus, after the processor 60 determines in step 110 that the entire edge has been found, the processor in step 114 locates the bar 46 within the stored image. Therefrom, the processor 60 can readily decode the symbol image using conventional decoding techniques.

Figure 18A:
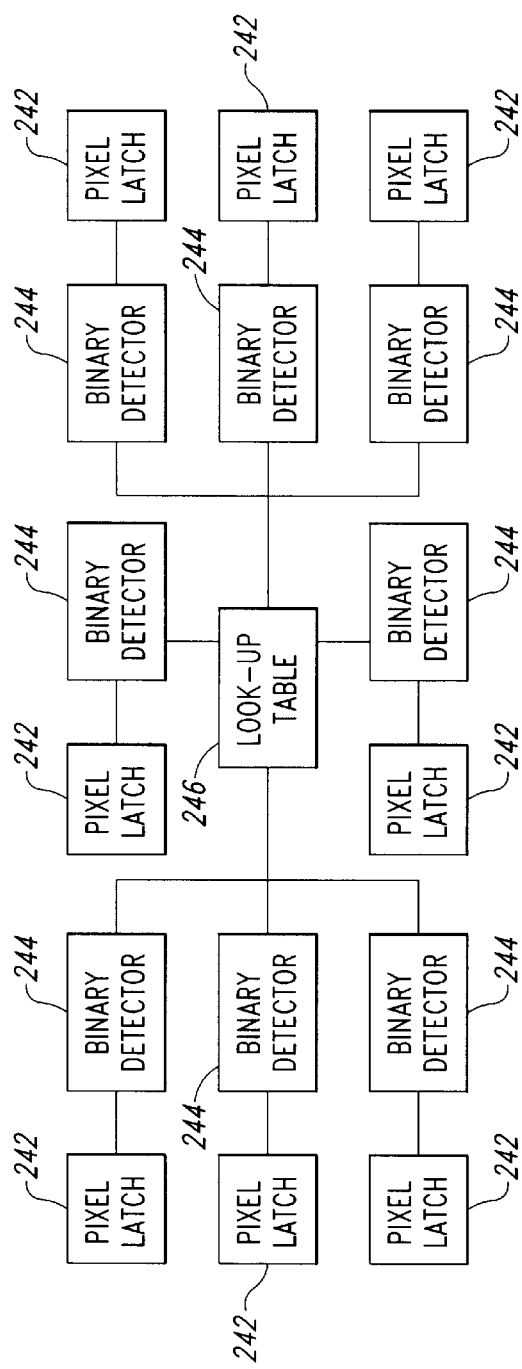
FIGS. 18A and 18B are block diagrams of an alternative or additional embodiment of a next pixel detection circuit for use in a reader such as the reader of FIG. 11.

Referring to FIG. 18A, an alternative portion of the reader 50 is shown as a next edge pixel locating circuit 240. The next edge pixel locating circuit 240 performs in hardware that which is performed by the processor 60 under steps 106 through 112. As a result, the circuit 240 can rapidly locate the next edge pixel, and like the circuit 200, allow the processor 60 to perform other tasks. The next edge pixel locating circuit 240 can form part of and be used with the reader 50, so as to be controlled by the processor 60.

The circuit 240 includes eight pixel latches 242. While latches are preferred, other stored devices can be employed, such as registers. The pixel latches 242 receive from the memory 57 or the sensor 54 stored pixel values of the eight surrounding pixels in the window 220 that surround the currently examined edge pixel 232. A binary detector 244 coupled to each of the pixel latches 242 detects a primary value of the pixel value stored in the pixel latch. Each of the binary detectors 244 is coupled to a lookup table 246 that stores therein the hexadecimal codes described above. The lookup table 246 compares the binary values from the binary detectors 244 with the hexadecimal codes stored in the lookup table. Based on the comparison therefrom, the lookup table 246 can determine which hexadecimal code matches the eight detected binary values, then thus determine the next edge pixel 235.

Figure 18B:
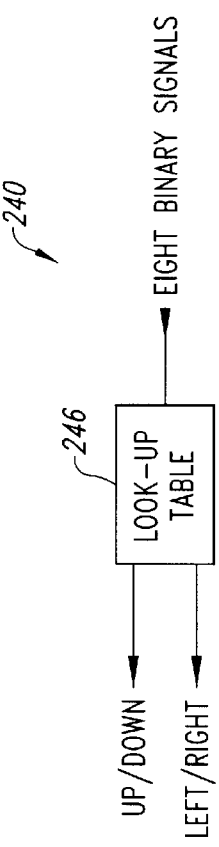

FIG. 18B describes in more detail the input/output data flow of the look-up-table 246. The input data are eight binary signals from the binary detectors 244. In response thereto, the look-up-table 246 outputs up/down and left/right signals, corresponding to the location of the next edge pixel.

Although specific embodiments of, and examples for, the present invention are described herein for purposes of illustration, various equivalent modifications can be made without departing from the spirit and the scope of the invention, as will be known by those skilled in the relevant art. For example, while the present invention has been generally described above as locating a bar of a PDF 417 symbol, the present invention can be applied to locate edges of other machine-readable symbols. Additionally, the present invention can be applied to machine vision systems that require locating edges of rectangular, square, or other linear patterns. The present invention can be readily used in computer systems with robotic arms for locating bar or linear shaped objects in various environments, e.g., in automated assembly environments.

The present invention can also incorporate other searching techniques and aspects thereof, such as those disclosed in the above patents and applications, all of which are incorporated herein by reference. The teachings provided herein of the present invention can also be applied to other machine vision systems, not necessarily machine-readable symbol readers. These and other equivalent changes can be made to the invention in light of the above detailed description. Accordingly, the invention is not limited by the disclosure, but instead its scope is to determined entirely with reference to the following claims.

We claim:

1. A bar code reading apparatus for decoding a bar code symbol representing encoded information, the symbol including a plurality of selectively spaced elongated bars and spaces between the bars, the apparatus comprising:

a sensor that receives light reflected from the symbol and produces an output signal therefrom that represents the reflectance of the bars and spaces of the symbol;

a memory for storing an image, including an image of the symbol, the stored image being comprised of a plurality of pixels;

edge pixel detecting circuitry coupled to the memory for detecting an edge pixel of one of the elongated bars in the stored image;

edge orientation circuitry, coupled to the edge detecting circuitry, that determines a direction of the edge based on the edge pixel;

a look-up table of codes, each code in the table indicating a next pixel depending upon predetermined arrangements of pixels in a window of pixels;

pixel analysis circuitry, coupled to the edge orientation circuitry, look-up table and memory, that sequentially and in the determined direction, determines a value based on an arrangement of pixels in a window surrounding the edge pixel, compares the produced value to a corresponding code in the look-up table, and locates a next edge pixel based on the corresponding code in the table, until the edge of the elongated bar is located in the memory; and a decoding circuit coupled to the pixel analysis circuitry and memory that decodes the image of the symbol based on the located edge; and wherein the pixel analysis circuitry includes:

eight latches that latch values of each pixel in a 3 pixel by 3 pixel window surrounding the edge pixel; and eight binary detectors each coupled to one of the latches for detecting a binary value of each latched value and producing a hexadecimal code as the produced value.

2. A bar code reading apparatus for decoding a bar code symbol representing encoded information, the symbol including a plurality of selectively spaced elongated bars and spaces between the bars, the apparatus comprising:

a sensor that receives light reflected from the symbol and produces an output signal therefrom that represents the reflectance of the bars and spaces of the symbol;

a memory for storing an image, including an image of the symbol, the stored image being comprised of a plurality of pixels;

edge pixel detecting circuitry coupled to the memory for detecting an edge pixel of one of the elongated bars in the stored image;

edge orientation circuitry, coupled to the edge detecting circuitry, that determines a direction of the edge based on the edge pixel;

a look-up table of codes, each code in the table indicating a next pixel depending upon predetermined arrangements of pixels in a window of pixels;

pixel analysis circuitry, coupled to the edge orientation circuitry, look-up table and memory, that sequentially and in the determined direction, determines a value based on an arrangement of pixels in a window surrounding the edge pixel, compares the produced value to a corresponding code in the look-up table, and locates a next edge pixel based on the corresponding code in the table, until the edge of the elongated bar is located in the memory; and a decoding circuit coupled to the pixel analysis circuitry and memory that decodes the image of the symbol based on the located edge; and wherein the look-up table includes a table of hexadecimal codes, each hexadecimal code in the table indicating a next pixel depending upon one of a plurality of predetermined arrangements of surrounding pixels in a 3 pixel by 3 pixel window having the edge pixel as a center pixel and eight surrounding pixels.

3. A bar code reading apparatus for decoding a bar code symbol representing encoded information, the symbol including a plurality of selectively spaced elongated bars and spaces between the bars, the apparatus comprising:

a sensor that receives light reflected from the symbol and produces an output signal therefrom that represents the reflectance of the bars and spaces of the symbol;

a memory for storing an image, including an image of the symbol, the stored image being comprised of a plurality of pixels;

edge pixel detecting circuitry coupled to the memory for detecting an edge pixel of one of the elongated bars in the stored image;

edge orientation circuitry, coupled to the edge detecting circuitry, that determines a direction of the edge based on the edge pixel;

a look-up table of codes, each code in the table indicating a next pixel depending upon predetermined arrangements of pixels in a window of pixels;

pixel analysis circuitry, coupled to the edge orientation circuitry, look-up table and memory, that sequentially and in the determined direction, determines a value based on an arrangement of pixels in a window surrounding the edge pixel, compares the produced value to a corresponding code in the look-up table, and locates a next edge pixel based on the corresponding code in the table, until the edge of the elongated bar is located in the memory; and a decoding circuit coupled to the pixel analysis circuitry and memory that decodes the image of the symbol based on the located edge; and wherein the edge orientation circuitry includes:

a 5 by 5 array of delay elements for storing a 5 pixel by 5 pixel window having the edge pixel as a center pixel and 24 surrounding pixels that surround the center pixel;

a first adder coupled to the array for adding the values of a top 10 of the stored surrounding pixels;

a second adder coupled to the array for adding the values of a bottom 10 of the stored surrounding pixels positioned below the center pixel;

a third adder coupled to the array for adding the values of a left 10 of the stored surrounding pixels positioned leftward of the center pixel;

a fourth adder coupled to the array for adding the values of a right 10 of the stored surrounding pixels positioned rightward of the center pixel;

a first magnitude comparison circuit coupled to the first and second adders and determining a greater of a magnitude of the added values of the 10 top and bottom surrounding pixels; and a second magnitude comparison circuit coupled to the third and fourth adders and determining a greater of a magnitude of the added values of the 10 left and right surrounding pixels.

4. An edge detecting apparatus for detecting an edge of an elongated shape in a stored image, the stored image being comprised of a plurality of pixels, the apparatus comprising:

an edge pixel detector for detecting an edge pixel of the elongated shape in the stored image;

a memory having stored therein a set of codes, each code in the set indicating a next pixel depending upon selected arrangements of pixels in a predetermined area of pixels;

a pixel analyzer, coupled to the memory, that sequentially analyzes a current arrangement of pixels in the predetermined area about the edge pixel, compares the analyzed area to a corresponding code in the set of codes and locates a next edge pixel based on the corresponding code in the set, until at least a portion of the edge of the elongated shape is located in the stored image; and wherein the pixel analyzer includes:

eight latches that latch values of each pixel in the predetermined area, the predetermined area being a 3 pixel by 3 pixel area surrounding the edge pixel; and eight binary detectors each coupled to one of the latches for detecting a binary value of each latched value and producing a hexadecimal code as the produced value.

5. The apparatus of claim 4 wherein the pixel analyzer is configured to analyze a square pixel area having the edge pixel as a center pixel and several surrounding pixels and assign a first value to each light surrounding pixel and a second value to each dark surrounding pixel.

6. An edge detecting apparatus for detecting an edge of an elongated shape in a stored image, the stored image being comprised of a plurality of pixels, the apparatus comprising:

an edge pixel detector for detecting an edge pixel of the elongated shape in the stored image;

a memory having stored therein a set of codes, each code in the set indicating a next pixel depending upon selected arrangements of pixels in a predetermined area of pixels;

a pixel analyzer, coupled to the memory, that sequentially analyzes a current arrangement of pixels in the predetermined area about the edge pixel, compares the analyzed area to a corresponding code in the set of codes and locates a next edge pixel based on the corresponding code in the set, until at least a portion of the edge of the elongated shape is located in the stored image; and wherein the set of codes in the memory includes a table of hexadecimal codes, each hexadecimal code in the set indicating a next pixel depending upon one of a plurality of predetermined arrangements of surrounding pixels in the predetermined area, the predetermined area being a 3 pixel by 3 pixel area having the edge pixel as a center pixel and eight surrounding pixels.

7. The apparatus of claim 6 further comprising a processor, wherein the processor includes the edge pixel detector and the pixel analyser.

8. The apparatus of claim 6 wherein the pixel analyzer is configured to analyze a square pixel area having the edge pixel as a center pixel and several surrounding pixels and assign a first value to each light surrounding pixel and a second value to each dark surrounding pixel.

9. The apparatus of claim 4 wherein the pixel analyzer is configured to store values of each pixel in a square pixel area having the edge pixel as a center pixel and several surrounding pixels and detect a value of each surrounding pixel.

10. The apparatus of claim 6 wherein the pixel analyzer is configured to store values of each pixel in a square pixel area having the edge pixel as a center pixel and several surrounding pixels and detect a value of each surrounding pixel.

11. An edge detecting apparatus for detecting an edge of an elongated shape in a stored image, the stored image being comprised of a plurality of pixels, the apparatus comprising:

an edge pixel detector for detecting an edge pixel of the elongated shape in the stored image;

a memory having stored therein a set of codes, each code in the set indicating a next pixel depending upon selected arrangements of pixels in a predetermined area of pixels;

a pixel analyzer, coupled to the memory, that sequentially analyzes a current arrangement of pixels in the predetermined area about the edge pixel, compares the analyzed area to a corresponding code in the set of codes and locates a next edge pixel based on the corresponding code in the set, until at least a portion of the edge of the elongated shape is located in the stored image, and further comprising:

a memory array for storing values of pixels in a pixel region having the edge pixel therein and top, bottom, left and right groups of surrounding pixels that surround the center pixel;

a first adder coupled to the array for adding the values of the top group of surrounding pixels;

a second adder coupled to the array for adding the values of the bottom group of surrounding pixels;

a third adder coupled to the array for adding the values of the left group of surrounding pixels;

a fourth adder coupled to the array for adding the values of the right group of surrounding pixels;

a first magnitude comparison circuit coupled to the first and second adders and determining a greater of a magnitude of the added values of the top and bottom groups of surrounding pixels;

a second magnitude comparison circuit coupled to the third and fourth adders and determining a greater of a magnitude of the added values of the left and right groups of surrounding pixels; and a dominant direction circuit that determines a direction of the edge based on the greater of the magnitudes from the first and second magnitude comparison circuits.

12. The apparatus of claim 11, further comprising a processor, wherein the processor includes the edge pixel detector and the pixel analyser.

13. The apparatus of claim 11 wherein the pixel analyzer is configured to analyze a square pixel area having the edge pixel as a center pixel and several surrounding pixels and assign a first value to each light surrounding pixel and a second value to each dark surrounding pixel.

14. The apparatus of claim 11 wherein the pixel analyzer is configured to store values of each pixel in a square pixel area having the edge pixel as a center pixel and several surrounding pixels and detect a value of each surrounding pixel.

15. An edge detecting apparatus for detecting an edge of an elongated shape in a stored image, the stored image being comprised of a plurality of pixels, the apparatus comprising:

an edge pixel detector for detecting an edge pixel of the elongated shape in the stored image;

a memory having stored therein a set of codes, each code in the set indicating a next pixel depending upon selected arrangements of pixels in a predetermined area of pixels;

a pixel analyzer, coupled to the memory, that sequentially analyzes a current arrangement of pixels in the predetermined area about the edge pixel, compares the analyzed area to a corresponding code in the set of codes and locates a next edge pixel based on the corresponding code in the set, until at least a portion of the edge of the elongated shape is located in the stored image;

further comprising an edge orientation analyzer coupled to receive the stored image and to analyze values of pixels in a pixel region having the edge pixel therein and top, bottom, left and right groups of surrounding pixels that surround the center pixel, compare the top and bottom groups of surrounding pixels to the left and right groups of surrounding pixels, and determine a dominant direction of the elongated shape based on the comparison of the top and bottom groups of surrounding pixels.

16. The apparatus of claim 15, further comprising a processor, wherein the processor includes the edge pixel detector and the pixel analyser.

17. The apparatus of claim 15 wherein the pixel analyzer is configured to analyze a square pixel area having the edge pixel as a center pixel and several surrounding pixels and assign a first value to each light surrounding pixel and a second value to each dark surrounding pixel.

18. The apparatus of claim 15 wherein the pixel analyzer is configured to store values of each pixel in a square pixel area having the edge pixel as a center pixel and several surrounding pixels and detect a value of each surrounding pixel.

19. A method of locating and decoding a bar code symbol representing encoded information, the symbol including a plurality of selectively spaced elongated bars, the method comprising:

storing an image of the symbol, the image being comprised of a plurality of pixels;

selecting a starting edge pixel in the stored image of an edge of the elongated bar;

determining a direction of the edge based on the starting edge pixel;

producing a value based on an arrangement of pixels in a window surrounding the edge pixel;

comparing the produced value to a corresponding code in a table of codes, each code in the table indicating a next pixel depending upon predetermined arrangements of pixels in the window;

locating a next edge pixel based on the corresponding code in the table;

repeating the producing, comparing and locating in the determined direction until the edge is located;

defining a position and orientation of the image of the symbol based on the located edge; and decoding the symbol; and wherein producing a value includes:

analyzing a 3 pixel by 3 pixel window having the edge pixel as a center pixel and eight surrounding pixels that surround the center pixel;

assigning a first binary value to each light surrounding pixel and a second binary value to each dark surrounding pixel;

determining a binary word from a sequence of the binary values of the surrounding pixels; and producing a hexadecimal code based on the binary word.

20. A method of locating and decoding a bar code symbol representing encoded information, the symbol including a plurality of selectively spaced elongated bars, the method comprising:

storing an image of the symbol, the image being comprised of a plurality of pixels;

selecting a starting edge pixel in the stored image of an edge of the elongated bar;

determining a direction of the edge based on the starting edge pixel;

producing a value based on an arrangement of pixels in a window surrounding the edge pixel;

comparing the produced value to a corresponding code in a table of codes, each code in the table indicating a next pixel depending upon predetermined arrangements of pixels in the window;

locating a next edge pixel based on the corresponding code in the table;

repeating the producing, comparing and locating in the determined direction until the edge is located;

defining a position and orientation of the image of the symbol based on the located edge; and decoding the symbol, wherein producing a value includes:

latching values of each pixel in a 3 pixel by 3 pixel window having the edge pixel as a center pixel and eight surrounding pixels;

detecting a binary value of each surrounding pixel; and producing a code based on the detected binary value of each surrounding pixel.

21. A method of locating and decoding a bar code symbol representing encoded information, the symbol including a plurality of selectively spaced elongated bars, the method comprising:

storing an image of the symbol, the image being comprised of a plurality of pixels;

selecting a starting edge pixel in the stored image of an edge of the elongated bar;

determining a direction of the edge based on the starting edge pixel;

producing a value based on an arrangement of pixels in a window surrounding the edge pixel;

comparing the produced value to a corresponding code in a table of codes, each code in the table indicating a next pixel depending upon predetermined arrangements of pixels in the window;

locating a next edge pixel based on the corresponding code in the table;

repeating the producing, comparing and locating in the determined direction until the edge is located;

defining a position and orientation of the image of the symbol based on the located edge; and decoding the symbol, wherein comparing the produced value includes creating a table of hexadecimal codes, each hexadecimal code in the table indicating a next pixel depending upon one of a plurality of predetermined arrangements of surrounding pixels in a 3 pixel by 3 pixel window having the edge pixel as a center pixel and eight surrounding pixels.

22. A method of locating and decoding a bar code symbol representing encoded information, the symbol including a plurality of selectively spaced elongated bars, the method comprising:

storing an image of the symbol, the image being comprised of a plurality of pixels;

selecting a starting edge pixel in the stored image of an edge of the elongated bar;

determining a direction of the edge based on the starting edge pixel;

producing a value based on an arrangement of pixels in a window surrounding the edge pixel;

comparing the produced value to a corresponding code in a table of codes, each code in the table indicating a next pixel depending upon predetermined arrangements of pixels in the window;

locating a next edge pixel based on the corresponding code in the table;

repeating the producing, comparing and locating in the determined direction until the edge is located;

defining a position and orientation of the image of the symbol based on the located edge; and decoding the symbol; and wherein determining a direction includes:

analyzing values of pixels in a 5 pixel by 5 pixel window having the edge pixel as a center pixel and 24 surrounding pixels that surround the center pixel;

comparing a top 10 of the surrounding pixels and a bottom 10 of the surrounding pixels, being positioned above and below the center pixel, respectively, to a left 10 of the surrounding pixels and a right 10 of the surrounding pixels, being positioned left and right of the center pixel; and determining a dominant direction of the elongated bar based on the comparing the top 10 of the surrounding pixels.

23. A method of locating and decoding a bar code symbol representing encoded information, the symbol including a plurality of selectively spaced elongated bars, the method comprising:

storing an image of the symbol, the image being comprised of a plurality of pixels;

selecting a starting edge pixel in the stored image of an edge of the elongated bar;

determining a direction of the edge based on the starting edge pixel;

producing a value based on an arrangement of pixels in a window surrounding the edge pixel;

comparing the produced value to a corresponding code in a table of codes, each code in the table indicating a next pixel depending upon predetermined arrangements of pixels in the window;

locating a next edge pixel based on the corresponding code in the table;

repeating the producing, comparing and locating in the determined direction until the edge is located;

defining a position and orientation of the image of the symbol based on the located edge; and decoding the symbol; and wherein determining a direction includes:

storing values of pixels in a 5 pixel by 5 pixel window having the edge pixel as a center pixel and 24 surrounding pixels that surround the center pixel;

adding the values of a top 10 of the surrounding pixels;

adding the values of a bottom 10 of the surrounding pixels positioned below the center pixel;

adding the values of a left 10 of the surrounding pixels positioned leftward of the center pixel;

adding the values of a right 10 of the surrounding pixels positioned rightward of the center pixel;

comparing a magnitude of the added values of the 10 top and bottom surrounding pixels;

comparing a magnitude of the added values of the 10 left and right surrounding pixels; and determining a dominant direction of the elongated bar based on the acts of comparing a magnitude.

24. A method of locating an edge of an elongated shape in a stored image being comprised of a plurality of pixels, the method comprising:

selecting a starting edge pixel in the stored image of an edge of the elongated shape;

analyzing an arrangement of pixels in an area about the edge pixel;

comparing the analyzed area to a corresponding code in a set of codes, each code in the set indicating a next pixel depending upon predetermined arrangements of pixels in the area;

locating a next edge pixel based on the corresponding code in the set; and repeating the analyzing, comparing and locating until at least a portion of the edge is located, and further comprising:

analyzing values of pixels in a pixel region having the edge pixel therein and top, bottom, left and right groups of surrounding pixels that surround the center pixel;

comparing the top and bottom groups of surrounding pixels to the left and right groups of surrounding pixels; and determining a dominant direction of the elongated shape based on the step of comparing the top and bottom groups of surrounding pixels.

25. The method of claim 24 wherein the elongated shape forms part of a machine-readable symbol, wherein the stored image includes an image of the symbol, and wherein the method further comprises:

defining a position and orientation of the image of the symbol in the stored image based on the located edge; and decoding the symbol.

26. The method of claim 24 wherein selecting, determining, analyzing, comparing, locating and repeating are performed.

27. The method of claim 24 wherein analyzing includes:
analyzing a square pixel area having the edge pixel as a center pixel and several surrounding pixels; and
assigning a first value to each light surrounding pixel and a second value to each dark surrounding pixel.

28. The method of claim 24 wherein analyzing includes:
storing values of each pixel in a square pixel area having the edge pixel as a center pixel and several surrounding pixels;
detecting a value of each surrounding pixel; and
producing a code based on the detected binary value of each surrounding pixel.

29. The method of claim 24 wherein analyzing includes:
storing values of each pixel in a square pixel area having the edge pixel as a center pixel and several surrounding pixels;
detecting a value of each surrounding pixel.

30. The method of claim 24 wherein comparing includes comparing values of the pixels in the analyzed area a table of digital codes, each digital code in the table indicating a next pixel depending upon one of a plurality of predetermined arrangements of surrounding pixels in the area of pixels having the edge pixel as a center pixel and several surrounding pixels.

31. The method of claim 24, further comprising determining an orientation of the edge based on the starting point.

32. A method of locating an edge of an elongated shape in a stored image being comprised of a plurality of pixels, the method comprising:

selecting a starting edge pixel in the stored image of an edge of the elongated shape;

analyzing an arrangement of pixels in an area about the edge pixel;

comparing the analyzed area to a corresponding code in a set of codes, each code in the set indicating a next pixel depending upon predetermined arrangements of pixels in the area;

locating a next edge pixel based on the corresponding code in the set; and repeating the analyzing, comparing and locating until at least a portion of the edge is located; and wherein determining a direction includes:
storing values of pixels in a pixel region having the edge pixel therein and top, bottom, left and right groups of surrounding pixels that surround the center pixel;
adding the values of the top group of surrounding pixels;
adding the values of the bottom group of surrounding pixels;
adding the values of the left group of surrounding pixels;
adding the values of the right group of surrounding pixels;
comparing a magnitude of the added values of the top and bottom groups of surrounding pixels;
comparing a magnitude of the added values of the left and right groups of surrounding pixels; and
determining a dominant direction of the elongated shape based on the acts of comparing a magnitude.

* * * * *